Oct. 9, 1956 G. P. McGRAW, JR 2,765,517
METHOD OF MAKING STACKED TYPE CAPACITORS
FROM METALLIZED DIELECTRIC
Filed Jan. 9, 1953 3 Sheets-Sheet 1
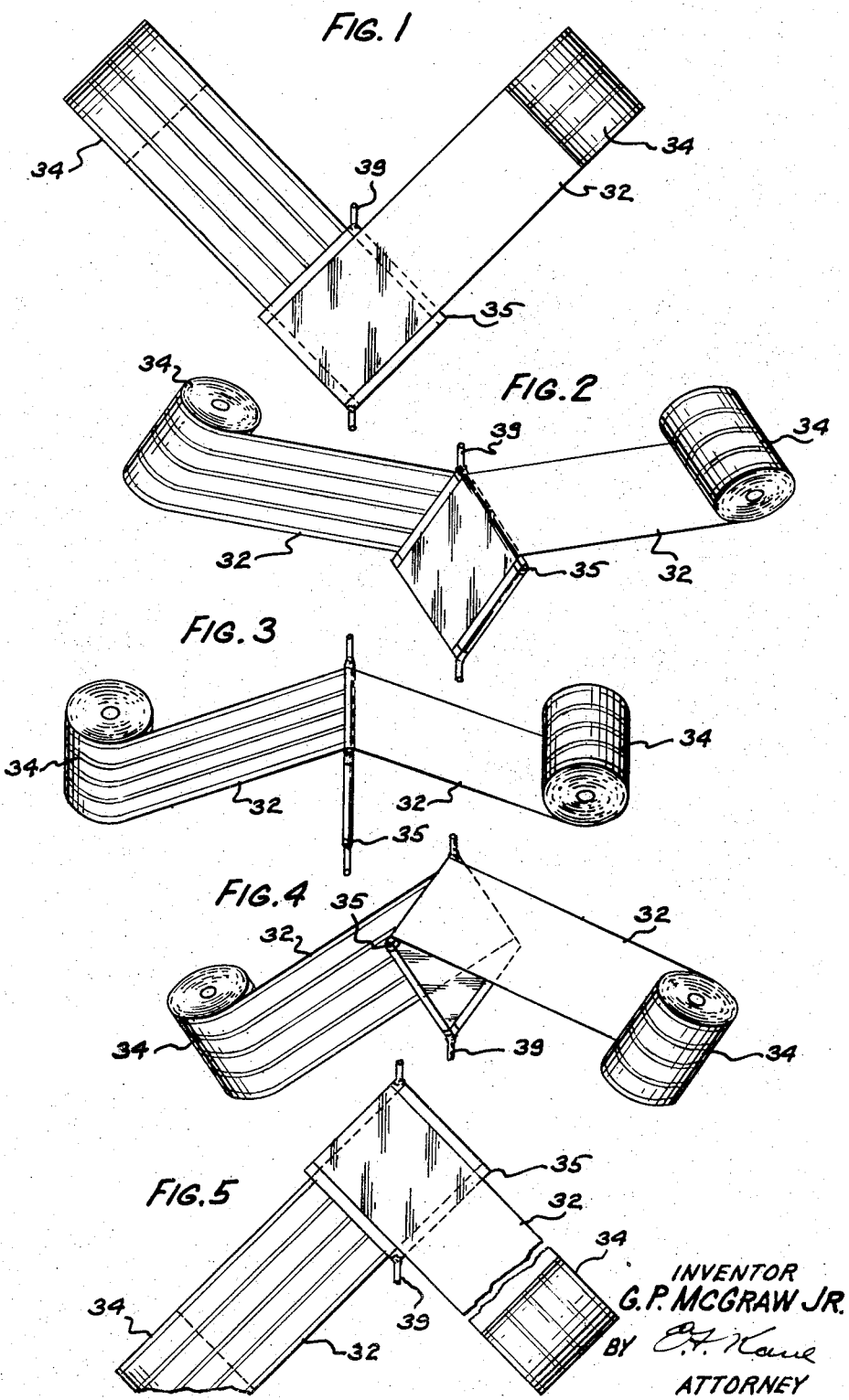
INVENTOR
G. P. MCGRAW JR.
BY
ATTORNEY Oct. 9, 1956
G. P. McGRAW, JR
2,765,517
METHOD OF MAKING STACKED TYPE CAPACITORS
FROM METALLIZED DIELECTRIC
Filed Jan. 9, 1953
3 Sheets-Sheet 2
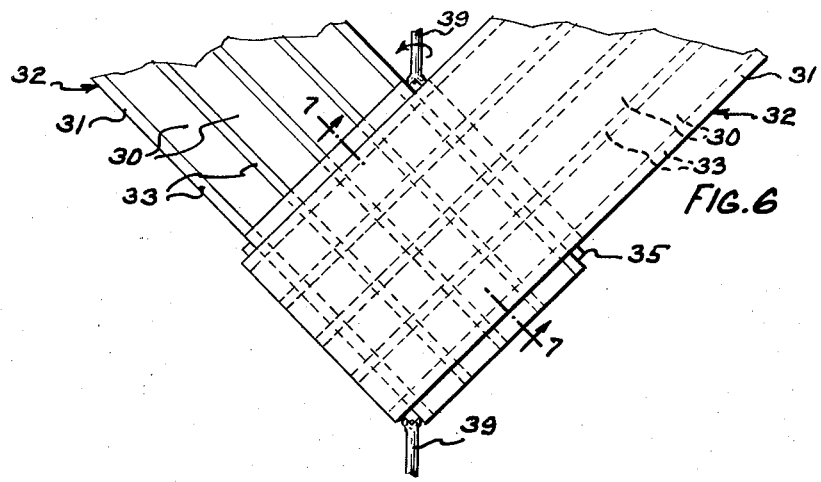
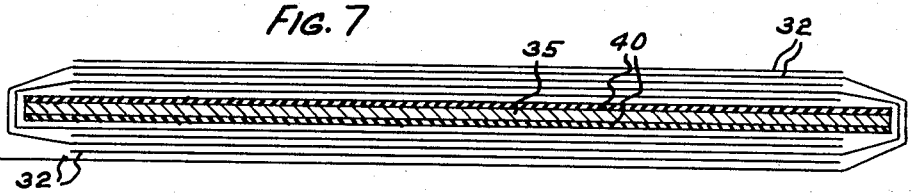
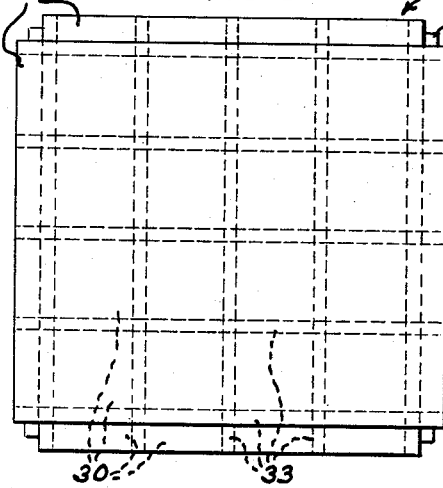
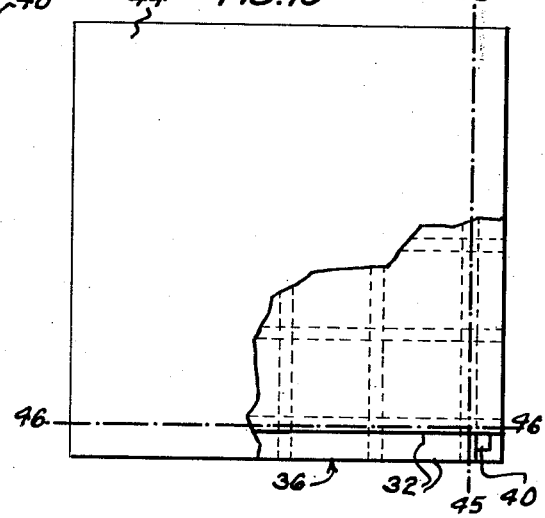
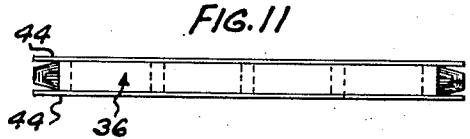
INVENTOR
G. P. McGRAW JR.
BY
ATTORNEY

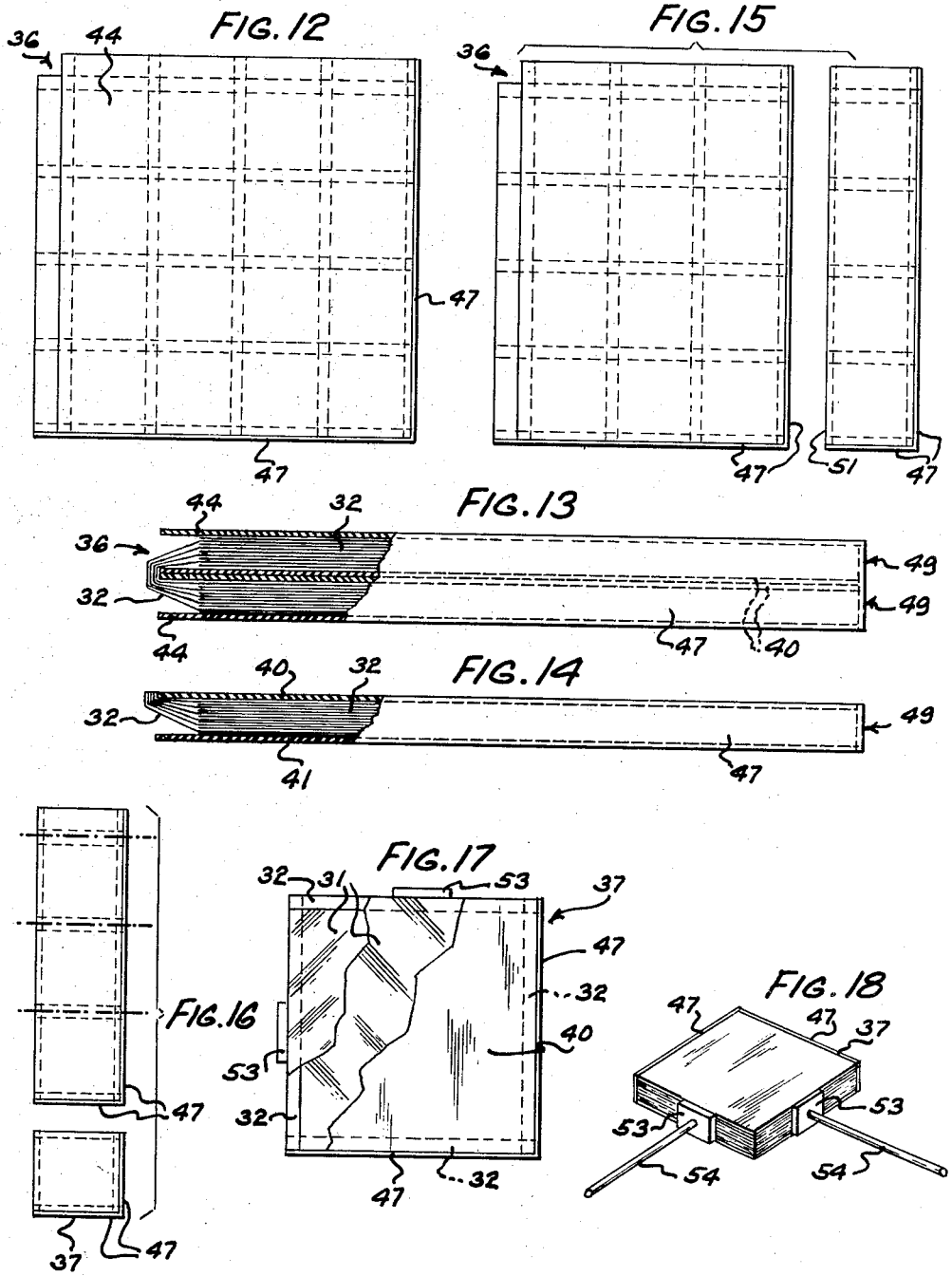

though onto the arbor 35 does not form a part of the present invention.

United States Patent Office 2,765,517
Patented Oct. 9, 1956

2,765,517

METHOD OF MAKING STACKED TYPE CAPACITORS FROM METALLIZED DIELECTRIC

George P. McGraw, Jr., Downers Grove, Ill., assignor to Western Electric Company, Incorporated, New York, N. Y., a corporation of New York Application January 9, 1953, Serial No. 330,409

12 Claims. (Cl. 29—25.42)

This invention relates to the making of capacitors and more particularly to a method of making stacked type capacitors from metallized dielectric.

Metallized paper, a thin strip of paper with a film of vaporized metal thereon, is ideal for making capacitors of small size and relatively large capacity, but because of its thinness and its tendency to curl and tear, difficulty has been experienced in fabricating capacitors therefrom, especially capacitors of the flat stacked type.

It is an object of the present invention to provide an economical method of making capacitors.

It is a further object of the present invention to provide an improved method of making stacked type capacitors from elongated strips of metallized dielectric.

In accordance with one method of fabricating capacitors of the stacked type, the invention contemplates applying a plurality of metal stripes of the width of the plates of the capacitors onto elongated webs of dielectric in spaced and parallel relation to each other and with bare margins on opposite sides of the stripes to form composite strips, winding two of the composite strips about each other to form a rectangular flat pad having a plurality of layers with the stripes in adjacent layers disposed at right angles to each other and with the stripes on alternate layers in aligned relation one to another, shearing the pad along the middle of each of the bare margins to form individual capacitor units, and applying binding material to the sides of the component parts of the stack after successive shearing operations to provide binding material on a pair of adjacent sides of each of the capacitor units for binding together the sheets thereof. Molten metal may be sprayed onto portions of the other two adjacent sides of each of the capacitor units to form terminals thereon electrically connecting alternate sets of the stripes on the sheets thereof.

Other objects and advantages of the invention will become apparent by reference to the following detailed description and the accompanying drawings illustrating a preferred embodiment thereof, in which Figs. 1 to 5 are diagrammatic views of a square flat arbor and a pair of composite sheets being wound thereon in various positions of the winding operation;

Fig. 6 is an enlarged fragmentary view similar to Fig. 1 showing the pair of composite strips partially wound into a pad on the arbor;

Fig. 7 is an enlarged cross-sectional view taken on the line 7—7 of Fig. 6 showing the partially wound pad;

Figs. 8 and 9 are plan and end views, respectively, of the pad after it has been wound on the arbor and removed therefrom;

Figs. 10 and 11 are views similar to Figs. 8 and 9 showing the pad with a pair of sheets of cardboard on opposite sides thereof;

Fig. 12 is a view similar to Fig. 10 showing the pad after it has been longitudinally and transversely sheared to remove the waste edge portions thereof;

Fig. 13 is an end sectional view of the pad as shown in Fig. 12 before the pad has been separated into two stacks of sheets;

Fig. 14 is a view similar to Fig. 13 showing one of the stacks of sheets;

Fig. 15 is a view similar to Fig. 12 showing a stack of sheets after it has been longitudinally sheared to separate a section therefrom;

Fig. 16 is a plan view of one of the sections after it has been transversely cut to separate an individual capacitor unit therefrom;

Fig. 17 is a plan view of a capacitor unit with terminals applied thereto; and

Fig. 18 is a view in perspective of the completed capacitor unit with lead wires extending from the terminals thereon.

As a first step in the method of making capacitors, a plurality of stripes 30 (Fig. 6) of metal or other conducting material are applied to one side of elongated webs 31 of paper or other dielectric sheet material in parallel and spaced relation to each other and to the longitudinal edges of the web to form composite strips 32 having bare margins 33 along opposite edges of the stripes. The metal stripes of the composite strip 32 preferably are formed by depositing metal in the form of metal vapor on the web of paper to form the metallized paper used in the present method of making capacitors. The composite strips 32 may be wound into rolls 34 (Fig. 1). A pair of the composite strips 32 are wound around an arbor 35 into a pad 36 which is to be subdivided into a plurality of individual capacitor units 37. The arbor 35 is a flat square plate having rods 39 extending from a pair of diagonally disposed corners. The rods 39 are adapted to be journalled in the suitable supports and connected to mechanism for rotating the arbor 35. The ends of a pair of the composite strips 32 may be attached as by mucilage to opposite sides of the arbor 35, but preferably a pair of sheets of paper or thin cardboard 40 are secured to the arbor 35 on opposite sides thereof and the ends of the composite strips 32 are secured to the sheets of cardboard 40 (Figs. 1 and 7).

The composite strips 32 are disposed on opposite sides of the arbor and at right angles to each other as shown in Fig. 1 and the rolls 34 are mounted in suitable roll supporting mechanism (not shown), which is adapted to oscillate the rolls from the position shown in Fig. 1 through the positions shown in Figs. 2, 3, 4, and 5 and back again through the position shown in Figs. 4, 3, 2, and 1 in timed relation to the rotation of the arbor 35 to wind successive layers of the composite strips 32 onto the arbor. The composite strips 32 are wound onto the arbor 35 with the stripes 30 directed inwardly and the stripes 30 and the bare margins 33 of the outer layer and the second layer are clearly visible from the outside of the fully wound pad 36 through the thin substantially transparent strip of dielectric of the outer layer of the pad and the stripes and bare margins of the second layer are visible through the bare margins 33 of the outer layer of the pad.

After a predetermined number of revolutions of the arbor 35 and the winding of a predetermined number of layers of the composite strips 32 onto the arbor to form the pad 36, the composite strips are severed along the one edge of the pad, after which a knife may be inserted between one of the cardboard sheets 40 and the arbor plate 35 to cut the composite strips 32 along a pair of adjoining edges of the arbor, and the pad 36 is removed from the arbor in preparation for the sub-dividing of the pads into the individual capacitor units 37.

The composite strips 32 may be secured to and wound around an arbor which is made from a sheet of paper, cardboard, or other dielectric material and which forms part of the pad 36 and from which the pad 36 need not be removed. When the composite strips 32 are sufficiently heavy they may be wound about each other to form the pad 36 without the use of an arbor.

The pad 36 may be cut longitudinally and transversely along the first longitudinally and the first transversely disposed bare margins 33 of the pad by forcing a thin cutting blade through the pad perpendicularly to the face of the pad to trim off the waste edge portions of the pad. It will be understood that as the knife cuts through the pad along the bare margins 33 of one set of alternate layers or sheets, it also cuts through the metal stripes on the other set of alternate sheets. Preferably, a pair of sheets of paper or thin cardboard 44—44 are applied to opposite sides of the pad (Figs. 10 and 11) and the pad is then sheared through along the lines 45—45 and 46—46 through the middle of the first one of each of the longitudinally and laterally extending bare stripes of the pad. A binding 47 (Fig. 12) is applied to each of the sheared edges of the pad to bind together the edges of the superposed layers of the pad 36. The binding may be in the form of a coating of adhesive binding material which dries on the pad.

As best seen in Fig. 13 the pad 36 comprises two stacks 49 of layers of superposed flat portions or sheets of the composite strips separated from each other by the cardboard sheets 40 and with the metal stripes 30 on the surfaces of the sheets in each of the stacks directed towards the cardboard sheets 40. The pad 36, including the pair of stacks 49, as shown in Fig. 13, may be sheared through along the longitudinally and the transversely extending bare margins 33 of the pad to divide the pad into a plurality of individual capacitor units. However, it may be desirable that in the shearing of the composite strips the movement of the cutting blade be in a direction to engage the metal stripe first and cut the stripe against the dielectric web on which it is supported, whereby the particles of metal which are disengaged from the stripes 30 are drawn over the edge surface of the strip 31 of paper dielectric during the shearing action and permit the establishment of a good electrical contact with terminals applied thereto. Thus, in order to shear both stacks 49 in this manner, the pad 36 is wound to include twice the number of sheets therein as are in the capacitor unit and the opposing halves or stacks of the pad are separated by inserting a knife between the sheets of cardboard 40 and slitting the connecting portions of the composite strips as at 50 (Fig. 9) to divide the pad 36 into two separate stacks 49 of sheets of metallized paper and then inverting the upper one.

Each of the stacks 49 may then be divided into sections 51 by cutting the stack 49 along the middle of the longitudinally extending bare margins 33 (Fig. 15) and after each shearing action the sheared edge surface of the remaining portion of the stack is coated with a coating 47 of binding material to bind the sheets of metallized paper of the section 51 and the sheets 40 and 44 of cardboard together. Each section 51, which has a width substantially equal to that of the one metal stripe 30 and one bare margin 33, and which has a length including a plurality of stripes 30 and margins 33, may then be sub-divided into individual capacitor units 37 by shearing through the middle of successive transversely disposed bare margins 33 to form the individual capacitor units 37 (Fig. 16) and after each transverse shearing action the sheared side of the remainder of the section is coated with the binding composition 47 to provide the individual capacitor unit 37 with bindings 47 on two adjacent sides thereof for binding together the edges of the sheets of metallized dielectric and the cardboard.

The shearing of the stack may be accomplished with a thin cutting blade having a sharp edge, the blade being pressed through the stack against the edge of a backing member. It will be understood that as the blade is passed through the bare stripes disposed in one direction on one set of alternate sheets of the stack, it will cut through the transversely extending stripes on the other set of alternate sheets.

Each of the individual capacitor units 37 into which the pad 36 has been sub-divided comprises a plurality of square sheets of paper dielectric and each sheet has a single metal stripe thereon extending to and between one pair of opposed edges of the sheet of dielectric and spaced from the other pair of edges of the sheet and with the stripes of metal on adjacent sheets arranged at right angles to each other to form two sets of alternate conducting plates.

Molten metal is sprayed onto portions of the adjacent uncoated sides of the capacitor unit to form a pair of terminals 53 electrically connecting the alternate sets of metal stripes or plates, respectively, of the capacitor unit. Wire leads 54 (Fig. 18) may be soldered to the terminals 53 if desired to facilitate connecting them into electrical circuits.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A method of making capacitors from composite strips of dielectric having a plurality of metal stripes thereon arranged in parallel relation to each other and with bare margins on opposite sides of the stripes, which comprises winding a pair of the strips about each other to form a rectangular flat pad having a plurality of layers with the stripes in adjacent layers disposed at right angles to each other and with the stripes on alternate layers in aligned relation one to another, shearing the pad along the middle of each of the bare margins to form individual capacitor units, and applying binding material to the sides of the component parts of the stack after successive shearing operations to provide binding material on a pair of adjacent sides of each of the capacitor units for binding together the layers thereof.

2. A method of making capacitors from composite strips of dielectric having a plurality of metal stripes thereon arranged in parallel relation to each other and with bare margins on opposite sides of the stripes, which comprises winding a pair of the strips about each other to form a rectangular flat pad having a plurality of layers with the stripes in adjacent layers disposed at right angles to each other and with the stripes on alternate layers in aligned relation one to another, shearing the pad along the middle of each of the bare margins to form individual capacitor units, applying binding material to the sides of the component parts of the stack after successive shearing operations to provide binding material on a pair of adjacent sides of each of the capacitor units for binding together the layers thereof, and spraying molten metal onto portions of the other two adjacent sides of each of the capacitor units to form terminals thereon electrically connecting alternate sets of the stripes on the sheets thereof.

3. A method of making capacitors which comprises applying a plurality of metal stripes on webs of dielectric in parallel relation to each other and with bare margins on opposite sides of the stripes to form composite strips, winding a pair of the composite strips about a rectangular arbor to form a rectangular flat pad having a plurality of layers with the stripes on adjacent layers disposed at right angles to each other and with the stripes on alternate layers in aligned relation one to another, shearing the pad along the middle of each of the bare margins to form individual capacitor units, and applying binding material to the sides of the parts of the stack after successive shearing operations to provide binding material on a pair of adjacent sides of each of the capacitor units.

4. A method of making capacitors which comprises applying a plurality of metal stripes on webs of dielectric in parallel relation to each other and with bare margins on opposite sides of the stripes to form composite strips, winding a pair of the composite strips about a rectangular arbor to form a rectangular flat pad having a plurality of layers with the stripes on adjacent layers disposed at right angles to each other and with the stripes on alternate layers in aligned relation one to another, shearing the pad along the middle of each of the bare margins to form individual capacitor units, applying binding material to the sides of the parts of the stack after successive shearing operations to provide binding material on a pair of adjacent sides of each of the capacitor units, and spraying molten metal onto the portions of the other two adjacent sides of each of the capacitor units to form terminals thereon electrically connecting alternate sets of the stripes on the sheets thereof.

5. A method of making capacitors which comprises the steps of applying stripes of metal to elongated webs of paper dielectric in parallel and spaced relation to each other and the edges of the web to form composite strips having bare margins on opposite sides of the stripes thereon, winding a pair of said composite strips about a rectangular arbor at right angles to each other to form a pad having a predetermined number of flat layers with the stripes on adjacent layers disposed at right angles to each other, shearing the pad along the middle of the first bare margin of each of a pair of adjacent edges of the pad, applying binding material to the trimmed sides of the pad to bind together the edges of the layers thereof, slitting the pad along the edges thereof to separate the layers thereof into two stacks, shearing each stack successively along the middle of the bare margins to divide the stack into individual capacitor units, applying binding material to the sheared side of the component parts of the stack after each shearing operation to provide a binding on two adjacent sides of each of the capacitor units for binding together the sheets thereof, and applying molten metal to portions of each of the other adjacent sides of the capacitor units to form terminals thereon electrically connecting alternate sets of stripes.

6. A method of making capacitors which comprises the steps of applying stripes of conducting material to elongated webs of paper dielectric in parallel and spaced relation to each other and the edges of the web to form composite strips having bare margins on opposite sides of the stripes, winding a pair of said composite strips about a flat rectangular arbor to form a pad having a plurality of flat layers with the stripes on adjacent layers disposed at right angles to each other, slitting the pad along the edges of the arbor to divide the layers of the pad into two separate stacks, shearing through each stack along the middle of successive bare margins to divide the stack into a plurality of individual capacitor units having sheets, each with a single stripe thereon, applying a coating of adhesive material to the sheared side of some of the components of the stack after each shearing operation to provide a binding on two adjacent sides of each of the capacitor units for binding together the layers thereof, and applying terminals to other adjacent sides of the unit electrically connecting alternate sets of the stripes.

7. A method of making capacitors which comprises the steps of applying stripes of metal to elongated webs of dielectric in parallel and spaced relation to each other and the edges of the web to form composite strips having bare margins on opposite sides of the stripes thereon, disposing a pair of said composite strips at right angles to each other and winding the strips about each other to form a pad having a plurality of flat layers with the stripes on adjacent layers disposed at right angles to each other and with the stripes on alternate layers in aligned relation one to another, shearing the pad along the middle of the first longitudinally disposed bare margin and along the middle of the first laterally disposed bare margin to trim said pad, applying a coating of adhesive material to the trimmed sides of the pad to adhere the edges of the layers of the pad together, slitting the pad through the middle of the layers and along the edges thereof to divide the pad into two stacks, shearing through each stack along the middle of successive longitudinally disposed bare margins to divide the stack into sections, applying a coating of adhesive material to the sheared side of the remainder of the stack after each shearing operation, transversely shearing each section along the middle of successive ones of the transversely extending bare margins to divide the section into individual capacitors, applying a coating of adhesive material to the sheared surface of the remainder of the section after each transverse shearing action to adhere the edges thereof together, and spraying molten metal to portions of the pair of uncoated adjacent sides of the individual capacitor units to form terminals thereon.

8. A method of fabricating capacitors comprising the steps of applying a plurality of metal stripes of the width of the plates of the capacitors onto elongated webs of dielectric in parallel relation to each other and with bare margins on opposite sides of the stripes to form composite strips, winding two of the composite strips about a flat rectangular arbor and each other to form a rectangular flat pad having a plurality of layers with the stripes in adjacent layers disposed at right angles to each other and with the stripes on alternate layers in aligned relation one to another, cutting the pad along the edges of the pad and the arbor and dividing the layers of the pad into two separate stacks of sheets, shearing each of the stacks along the middle of each of the bare margins to form individual capacitor units, applying binding material to the sides of the component parts of the stack after successive shearing operations to provide binding material on a pair of adjacent sides of each of the capacitor units for binding together the sheets thereof, and spraying molten metal onto portions of the other two adjacent sides of each of the capacitor units to form terminals thereon electrically connecting alternate sets of the stripes on the sheets thereof.

9. A method of making capacitors, which comprises the steps of applying a plurality of continuous stripes of electrical conducting material onto webs of dielectric in parallel and spaced relation to each other and the edges of the webs to form composite strips having bare margins on opposite sides of the stripes, arranging portions of the composite strips in superposed relation to each other to form a pad of flat layers of said composite strips with the stripes in alternate layers in superposed aligned relation one to another and with the stripes on adjacent layers intersecting each other at right angles, cutting through the pad successively along the middle of each one of a pair of bare intersecting margins along the edge portions of the pad, applying a coating of binding material to the cut sides of the pad after each cutting operation to bind together the edges of the layers of the pad, cutting through the pad successively along the middle of each of the bare margins extending in one direction of the pad to form elongated sections of the pad and applying a coating of binding material to the cut side of the remainder of the pad after each cutting operation to provide a pair of coated adjacent sides on the remainder of the pad for binding together the layers thereof, transversely cutting each of the sections along the middle of successive transversely disposed bare margins of the sections to form individual capacitor units, applying a coating of binding material to the cut side of the remainder of the section of the pad after each cutting operation to bind together the edges of the layers thereof, and applying molten metal to portions of the uncoated sides of the capacitor units to form terminals thereon electrically connecting the two sets of alternate stripes of the capacitor unit.

10. A method of making capacitors from composite webs of dielectric having continuous parallel stripes of conducting material thereon separated from each other by bare margins which comprises the steps of arranging the composite webs with portions thereof in superposed relation to one another to form a pad of flat layers of composite webs with the stripes in alternate layers in superposed aligned relation one to another and with the stripes in adjacent layers intersecting each other at right angles, shearing the pad and the components thereof along the middle of the successive margins to form capacitor units, and applying binding material to one sheared surface of the components thus formed after successive shearings to bind together the layers thereof and provide capacitor units having two adjacent sheared sides coated with binding material.

11. A method of making capacitors from composite webs of dielectric having parallel continuous stripes of conducting material thereon separated from each other by bare margins which comprises the steps of arranging the composite webs with portions thereof in superposed relation to one another to form a pad of flat layers of composite webs with the stripes in alternate layers in superposed aligned relation one to another and with the stripes in adjacent layers intersecting each other at right angles, successively shearing the pad and the components thereof along the middle of the bare margins to form capacitor units having one stripe on each layer, applying binding material to one sheared surface of the components thus formed after each shearing to bind together the layers thereof and provide capacitor units having two adjacent sheared sides coated with binding material, and applying molten metal to portions of the uncoated sheared sides of the capacitor units to form terminals thereon electrically interconnecting the metal stripes on the two sets of alternate layers of the capacitor unit.

12. A method of making capacitors from composite webs of dielectric having continuous parallel stripes of conductive material thereon separated from each other by bare margins which comprises folding portions of the composite webs into interleaved relation to each other to form a pad of flat layers of composite webs with the stripes on the individual webs in parallel and aligned relation to each other and at right angles to the stripes in the other web, shearing the pad and the components thereof along the middle of successive margins to form capacitor units, applying binding material to one sheared surface of the components thus formed after each successive shearing to bind together the layers thereof and provide capacitor units having two adjacent sheared sides coated with binding material, and applying molten metal to portions of the uncoated sheared sides of the capacitor units to form terminals thereon electrically interconnecting the metal stripes on the two sets of alternate layers of the capacitor unit.

References Cited in the file of this patent

UNITED STATES PATENTS 1,479,315    Pickard    Jan. 1, 1924

FOREIGN PATENTS 903,040    France    Sept. 21, 1945